US007328933B2

(12) United States Patent
Vitale et al.

(10) Patent No.: US 7,328,933 B2
(45) Date of Patent: Feb. 12, 2008

(54) DOOR ASSIST PEDAL

(75) Inventors: Nicholas A. Vitale, Fraser, MI (US); Richard J. Hodges, New Baltimore, MI (US); Thomas H. Hipp, Harrison Township, MI (US); Dan W. Figlioli, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 72 days.

(21) Appl. No.: 11/383,774

(22) Filed: May 17, 2006

(65) Prior Publication Data

US 2007/0267888 A1 Nov. 22, 2007

(51) Int. Cl.
*B60J 5/00* (2006.01)

(52) U.S. Cl. .................................................. 296/146.4

(58) Field of Classification Search .................. 296/75, 296/146.4, 152; 49/263, 270, 273, 274, 357
See application file for complete search history.

(56) References Cited

U.S. PATENT DOCUMENTS

| | | | | |
|---|---|---|---|---|
| 4,026,343 | A * | 5/1977 | James | 160/189 |
| 4,062,604 | A * | 12/1977 | Popper | 312/211 |
| 4,911,508 | A * | 3/1990 | Tillman | 49/278 |
| 5,002,331 | A * | 3/1991 | Frye et al. | 49/357 |

* cited by examiner

*Primary Examiner*—Lori L. Lyjak

(57) ABSTRACT

The present invention provides a door assist pedal assembly including a housing member that is mountable to a vehicle floor panel. A pedal is pivotably secured to the housing member, and a cam is also rotatably secured to the housing member such that the cam is engaged by the pedal. A spring configured to bias the pedal into a fully depressed position is disposed between the pedal and the housing member. A cable couples the cam with a vehicle door. Actuation of the pedal by a vehicle occupant causes the cam to rotate and thereby retract the cable such that the vehicle door is pulled toward a closed position.

16 Claims, 2 Drawing Sheets

DOOR ASSIST PEDAL

TECHNICAL FIELD

The present invention pertains generally to a pedal assembly configured to provide assistance in closing a vehicle door.

BACKGROUND OF THE INVENTION

When the doors of a conventional vehicle are fully opened, they may be difficult to reach from a seated position within the vehicle. Therefore, after entering a vehicle, it may be difficult for some occupants to reach and thereafter close the vehicle door while remaining seated.

SUMMARY OF THE INVENTION

The door assist pedal assembly of the present invention includes a housing member that is mountable to a vehicle floor panel. A pedal is pivotably secured to the housing member, and a cam is also rotatably secured to the housing member such that the cam is engaged by the pedal. A spring configured to bias the pedal into a fully depressed position is disposed between the pedal and the housing member. A cable couples the cam with a vehicle door. Actuation of the pedal by a vehicle occupant causes the cam to rotate and thereby retract the cable such that the vehicle door is pulled toward a closed position.

The door assist pedal assembly may also include a cosmetic cover attached to the housing member.

The door assist pedal assembly may also include a first pivot pin disposed between the housing member and the pedal to facilitate the rotation of the pedal.

The door assist pedal assembly may also include a second pivot pin disposed between the housing member and the cam to facilitate the rotation of the cam.

According to an alternate embodiment of the present, the door assist pedal assembly may be electronic. The electronic door assist pedal assembly includes a manually actuatable device which is mountable to the vehicle. The manually actuatable device may include, for example, a pedal; a button; or a switch. A sensor is configured to identify actuation of the manually actuatable device and thereafter transmit a signal. An actuator operatively connected to a vehicle door is configured to receive the signal from the sensor and thereafter apply a force to the vehicle door such that the vehicle door is pulled toward a closed position. The actuator may include, for example, a solenoid; a hydraulic actuator; or a pneumatic actuator.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
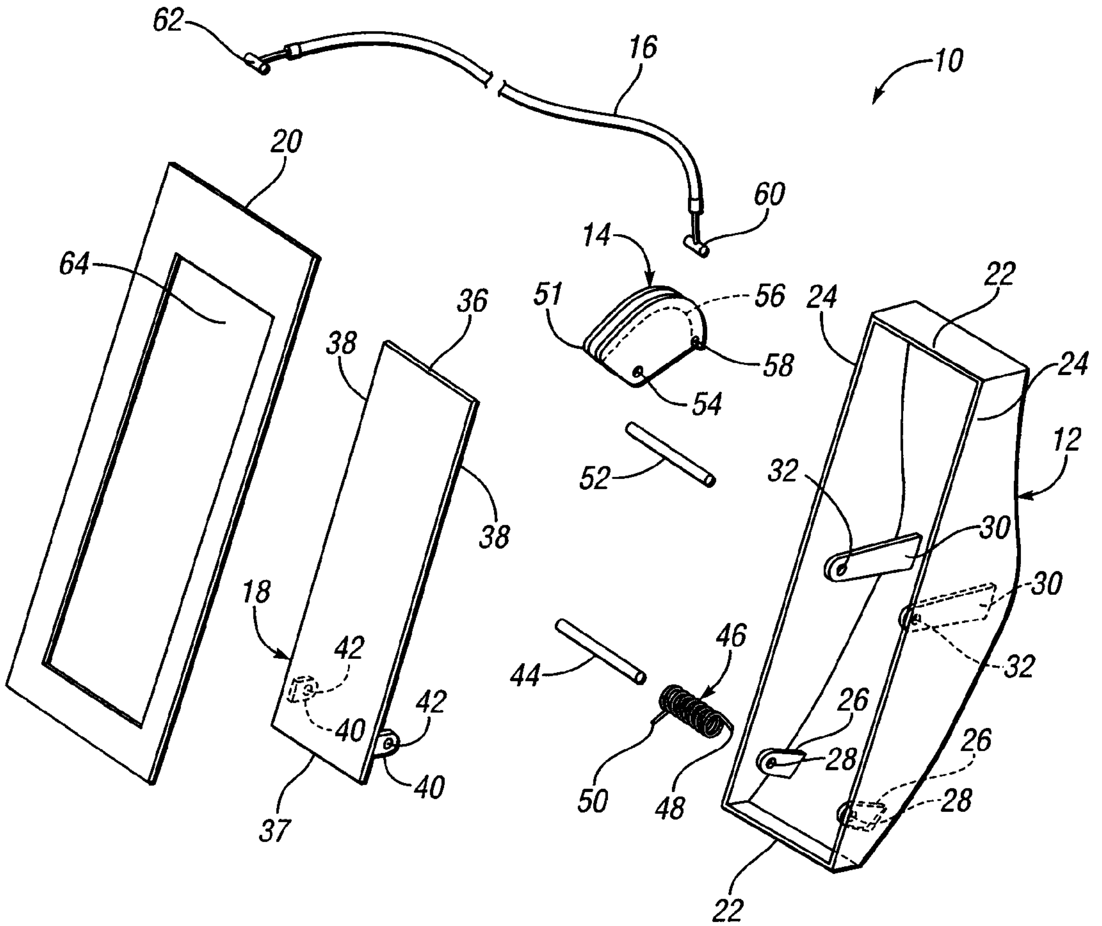
FIG. 1 is an exploded illustration of a door assist pedal assembly in accordance with the preferred embodiment of the present invention.

Referring to the drawings, wherein like reference numbers refer to like components, FIG. 1 shows an exploded view of a door assist pedal assembly 10 in accordance with the present invention. The door assist pedal assembly 10 preferably includes a housing member 12, a cam 14, a cable 16, a pedal 18, and a cover 20.

Figure 2A:
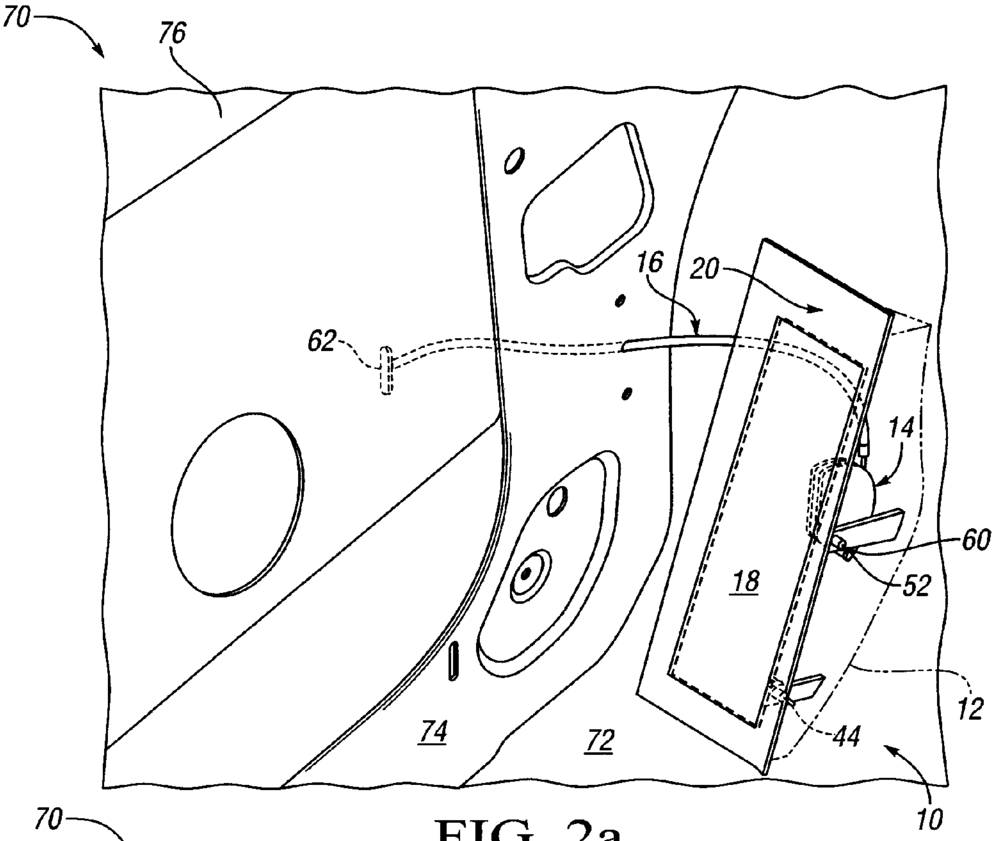
FIG. 2*a* is a perspective view of the door assist pedal assembly of FIG. 1 installed in a vehicle with the vehicle door closed.
Figure 2B:
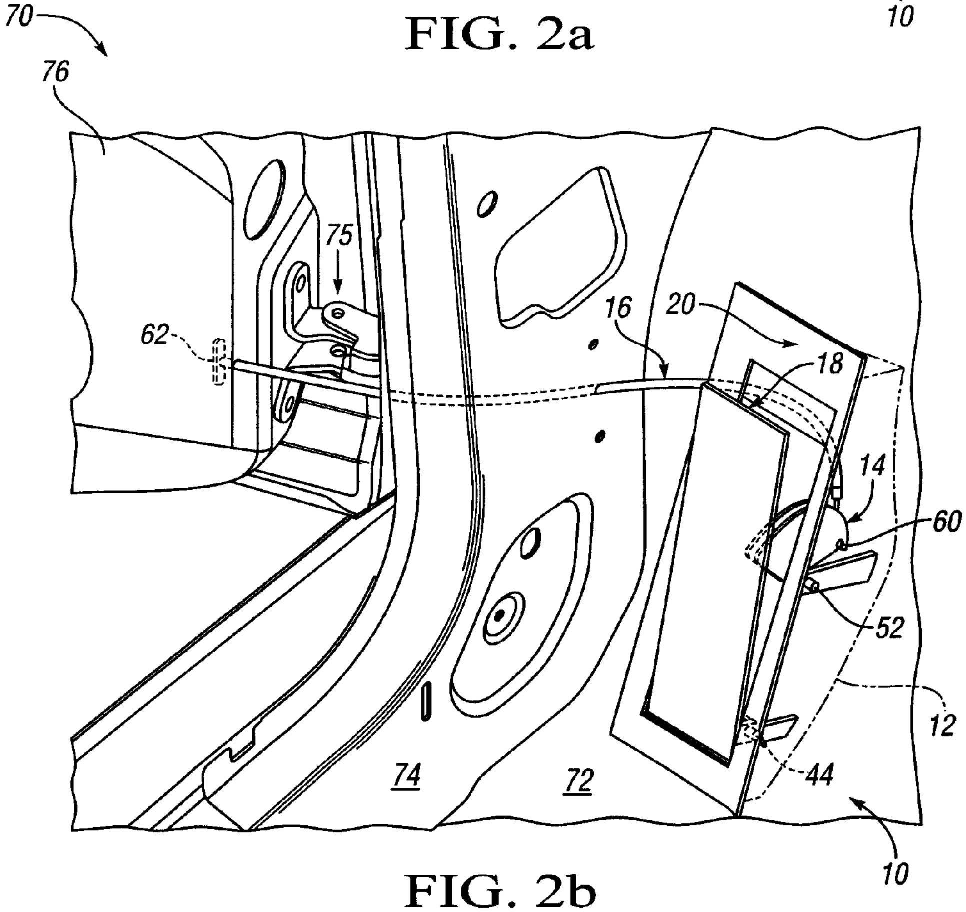
FIG. 2*b* is a perspective view of the door assist pedal assembly of FIG. 1 installed in a vehicle with the vehicle door open.

The housing member 12 is configured to retain at least some of the other pedal assembly components and to facilitate attachment to the vehicle 70 (shown in FIGS. 2*a* and 2*b*). The housing member defines generally opposing end portions 22, and generally opposing side portions 24. The housing member 12 includes two pedal support towers 26 positioned near an end portion 22. The pedal support towers 26 each include a pedal attachment aperture 28 near a terminal end portion thereof. The housing member 12 also includes two cam support towers 30 positioned approximately halfway between the end portions 22. The cam support towers 30 each include a cam attachment aperture 32 near a terminal end portion thereof.

The pedal 18 is generally rectangular defining a top end portion 36, a bottom end portion 37, and generally opposing side portions 38. The pedal 18 includes two mounting brackets 40 near the bottom end portion 37. The mounting brackets 40 each include a mounting aperture 42. The pedal 18 is pivotably secured to the housing member 12 by aligning the mounting apertures 42 with the pedal attachment apertures 28 and then inserting a pivot pin 44 therethrough. The pedal 18 is pivotable about the pivot pin 44 between a fully depressed position (shown in FIG. 2*a*) wherein the pedal is generally flush with the cover 20, and a fully released position (shown in FIG. 2*b*). A spring 46 is preferably disposed about the pivot pin 44. The spring includes a first terminal end 48 configured to engage one of the pedal support towers 26 and a second terminal end 50 configured to engage the pedal 18. The spring 46 biases the pedal 18 into the fully depressed position shown in FIG. 2*a*.

As shown in FIG. 1, the cam 14 is generally semi-circular, and defines a pedal engagement end portion 51, a mounting aperture 54, and a cable retention notch 58. The cam 14 is pivotably secured to the housing member 12 by aligning the mounting aperture 54 with the cam attachment apertures 32 and then inserting a pivot pin 52 therethrough. The cam 14 also defines a cable guide track 56 on a radially outer portion thereof.

The cable 16 includes a cam engagement end 60 and a generally opposite door engagement end 62. The cam engagement end 60 is secured within the cable retention notch 58 such that a portion of the cable 16 is disposed within and guided by the cable guide track 56. The door engagement end 62 is secured to the vehicle door 76 (shown in FIGS. 2*a* and 2*b*) as will be described in detail hereinafter.

The cover 20 is generally rectangular and defines a central generally rectangular aperture 64. The cover 20 is attached to the housing member 12 and the aperture 64 allows clearance for the pedal 18. The cover 20 is preferably implemented for cosmetic purposes.

Referring to FIGS. 2*a*-2*b*, a perspective view of the door assist pedal assembly 10 installed into a vehicle 70 is shown. The vehicle 70 includes a floor panel 72 mounted to a hinge pillar 74. A door 76 is pivotably mounted to the hinge pillar 74 via one or more door hinges 75 (shown in FIG. 2*b*). Accordingly, the door 76 is pivotable about the one or more door hinges 75 between a fully closed position (shown in FIG. 2*a*) and a fully open position (shown in FIG. 2*b*). The door assist pedal assembly 10 of FIGS. 2*a*-2*b* is shown applied to the drivers side front door of the vehicle 70; however it should be appreciated that the door assist pedal may also be provided for any other vehicle doors.

The housing member 12 of the door assist pedal assembly 10 is mounted to the floor panel 72. The cable 16 extends from the cam 14 through the hinge pillar 74 such that door engagement end 62 of the cable 16 is secured to the door 76. As will be described in detail hereinafter, the door assist pedal assembly 10 is actuatable by an occupant within the vehicle 70 to pull the door 76 inward toward its closed position (shown in FIG. 2*a*).

Referring to FIG. 2*a*, the vehicle 70 is shown with the door 76 in its fully closed position. When the door 76 is closed, the pedal 18 is biased into its depressed position via the spring 46 (shown in FIG. 1) so that the pedal 18 is generally flush with the cover 20. More precisely, the spring 46 pivots the pedal 18 in a clockwise direction about the pivot pin 44 (shown in FIG. 1) into its depressed position shown in FIG. 2*a*. As the spring 46 is pivoting the pedal 18 about the pivot pin 44, the pedal engages and rotates the cam 14 in a clockwise direction about the cam pivot pin 52. When the door 76 is closed, there is slack in the cable 16 which is primarily located within the door 76.

Referring to FIG. 2*b*, the vehicle 70 is shown with the door 76 in its fully open position. As the door is being opened, the slack in the cable 16 is initially taken up and thereafter the cable 16 pulls the cam 14 such that the cam 14 is rotated in a counter-clockwise direction about the pivot pin 52. When the cam 14 is rotated in this manner, the pedal engagement end 51 of the cam 14 engages and pivots the pedal 18 in a counter-clockwise direction about the pivot pin 44 into its released position (shown in FIG. 2*b*).

When an occupant opens the door 76 to enter the vehicle 70, the pedal 18 is pivoted from its fully depressed position (shown in FIG. 2*a*) to its fully released position (shown in FIG. 2*b*) in the manner described hereinabove. From a seated position within the vehicle 70, the occupant can manually depress the pedal 18 which engages and rotates the cam 14 in a clockwise direction about the pivot pin 52. This rotation of the cam 14 retracts or pulls the cable 16 coupling the cam 14 and the door 76 such that the door 76 is drawn toward its closed position (shown in FIG. 2*b*). According to the preferred embodiment, when the occupant manually depresses the pedal 18, the door 76 is only partially closed to bring the door 76 to within reach of the occupant. Thereafter, the occupant can conveniently close the door 76 in a conventional manner. Alternatively, however, a door assist pedal assembly configured to fully close the door 76 may also be envisioned.

Figure 3:
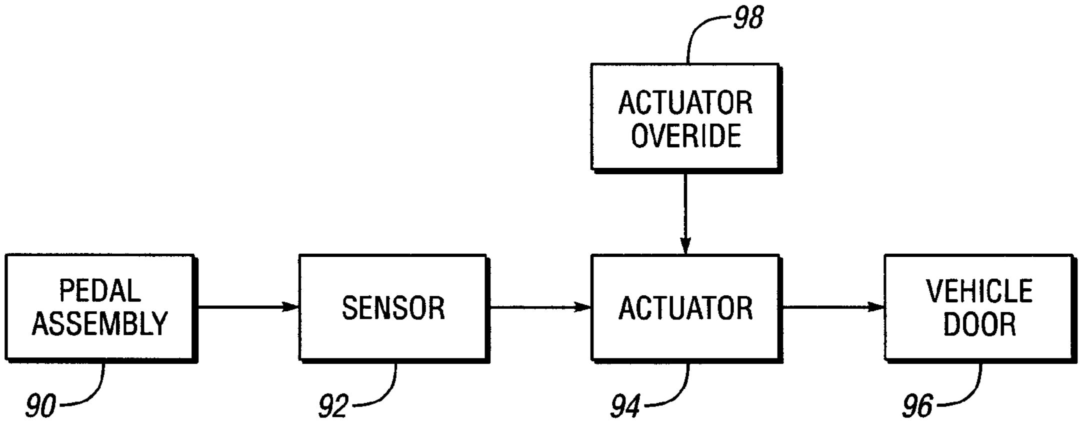
FIG. 3 is a schematic illustration of a door assist pedal assembly in accordance with an alternate embodiment of the present invention.

Referring to FIG. 3, a schematic illustration of an electronically controlled door assist pedal assembly 90 in accordance with an alternate embodiment of the present invention is shown. The door assist pedal assembly 90 is operatively connected to a sensor 92 which is configured to selectively transmit a signal to an actuator 94. The actuator 96 is operatively connected to a vehicle door 96 and is configured to apply a force to at least partially close the door 96.

The door assist pedal assembly 90 may include a pedal similar to the pedal 18, or alternatively may include any selectively actuatable device such as a button or a switch. The sensor 92 is preferably a conventional device adapted to identify an occupant's actuation of the door assist pedal assembly 90 and thereafter transmit a signal to the actuator 94. The actuator 94 is preferably also a conventional device configured to apply a force to at least partially close the door 96. The actuator 94 may include, for example, a solenoid; a hydraulic actuator; or a pneumatic actuator.

A manual override device 98 may be connected to the actuator 94 to ensure the door 96 can be manually opened in the event of an emergency, even if the electrical system is disabled. The override device 98 may be configured to disable the actuator 94 or to de-couple the actuator 94 from the door 96, depending on the specific type of actuator.

While the best modes for carrying out the invention have been described in detail, those familiar with the art to which this invention relates will recognize various alternative designs and embodiments for practicing the invention within the scope of the appended claims.

The invention claimed is:

1. A door assist pedal assembly comprising:
a pedal pivotably mounted to a vehicle;
a rotatable cam engaged with the pedal; and
a cable coupling the cam with a vehicle door;
wherein actuation of the pedal causes the cam to rotate and thereby retract the cable such that the vehicle door is pulled toward a closed position.

2. The door assist pedal assembly of claim 1, further comprising a housing member configured to pivotably retain the pedal and rotatably retain the cam.

3. The door assist pedal assembly of claim 2, further comprising a spring disposed between the pedal and the housing member, said spring being configured to bias the pedal into a fully depressed position.

4. The door assist pedal assembly of claim 3, further comprising a cosmetic cover attached to the housing member.

5. The door assist pedal assembly of claim 4, further comprising a first pivot pin disposed between the housing member and the pedal to facilitate the rotation of the pedal.

6. The door assist pedal assembly of claim 5, further comprising a second pivot pin disposed between the housing member and the cam to facilitate the rotation of the cam.

7. A door assist pedal assembly for a vehicle comprising:
a housing member mounted to a vehicle floor panel;
a pedal pivotably secured to the housing member;
a spring disposed between the pedal and the housing member, said spring being configured to bias the pedal into a fully depressed position;
a cam rotatably secured to the housing member, said cam engageable with the pedal; and
a cable coupling the cam with a vehicle door;
wherein actuation of the pedal causes the cam to rotate and thereby retract the cable such that the vehicle door is pulled toward a closed position.

8. The door assist pedal assembly of claim 7, further comprising a cosmetic cover attached to the housing member.

9. The door assist pedal assembly of claim 8, further comprising a first pivot pin disposed between the housing member and the pedal to facilitate the rotation of the pedal.

10. The door assist pedal assembly of claim 9, further comprising a second pivot pin disposed between the housing member and the cam to facilitate the rotation of the cam.

11. A door assist pedal assembly for a vehicle comprising:
a manually actuatable device mounted to the vehicle;
a sensor configured to identify actuation of the manually actuatable device and thereafter transmit a signal; and
an actuator operatively connected to a vehicle door, said actuator configured to receive the signal from the sensor and thereafter apply a force to the vehicle door such that the vehicle door is pulled toward a closed position.

12. The door assist pedal assembly of claim 11, further comprising a manual override device operatively connected to the actuator.

13. The door assist pedal assembly of claim 11, wherein said manually actuatable device includes a pedal.

14. The door assist pedal assembly of claim 11, wherein said actuator includes a solenoid.

15. The door assist pedal assembly of claim 11, wherein said actuator includes a hydraulic actuator.

16. The door assist pedal assembly of claim 11, wherein said actuator includes a pneumatic actuator.

* * * * *